Sept. 14, 1926.
W. EHRHART ET AL
BAKING PAN
Filed Nov. 2, 1925
1,599,994
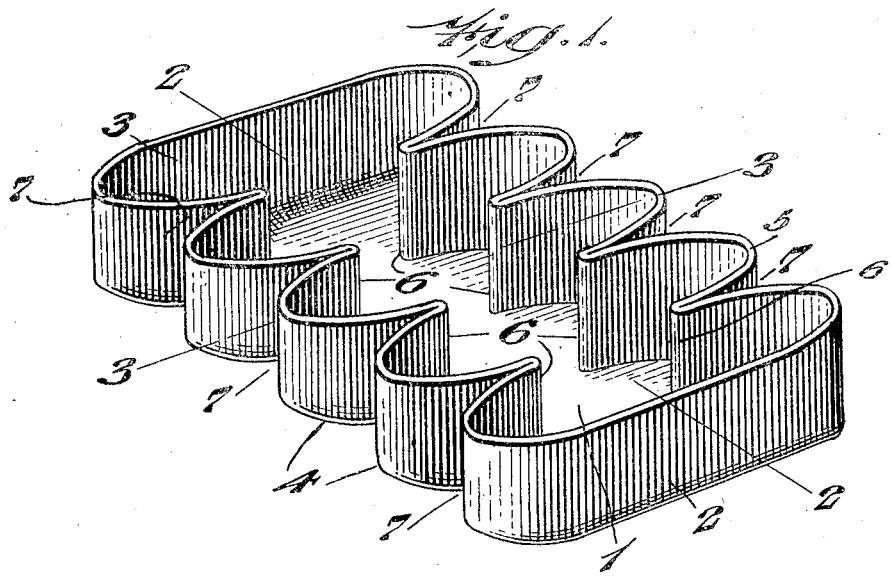
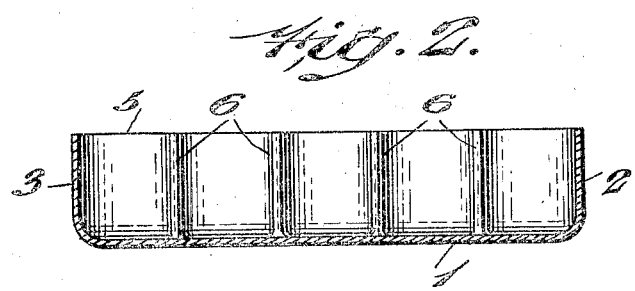
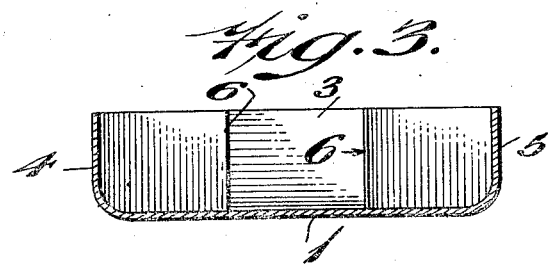
INVENTORS.
WILLIAM EHRHART,
ROBERT D. GOLDFEDER.
ATTORNEYS.

Patented Sept. 14, 1926.

1,599,994

UNITED STATES PATENT OFFICE.

WILLIAM EHRHART, OF LANCASTER, AND ROBERT D. GOLDFEDER, OF PHILADELPHIA, PENNSYLVANIA.

BAKING PAN.

Application filed November 2, 1925. Serial No. 66,164.

This invention, generally stated, relates to baking pans and has more especial relation to that type of baking pan in which are baked rolls, such as are used especially for containing sausages, such rolls and sausages being usually termed "hot dog sandwiches".

The leading object of the present invention is to provide a simple, efficient and comparatively inexpensive pan of the character stated formed of an integral structure and so arranged that the sides, ends and bottom are connected upon curved lines to properly shape the rolls, said pan having oppositely disposed, fluted side walls which side walls terminate in inwardly extended, spaced partitions to form compartments, the space between adjacent compartments being continuous so that the rolls when baked as an integral body may be easily broken apart for a purpose to be presently described.

Other and further objects not at this time more particularly pointed out will appear hereinafter.

The invention consists of the novel construction hereinafter described and finally claimed.

Referring to the drawings:

Fig. 1 is a view in perspective of a baking pan embodying features of the invention.

Fig. 2 is a view in section taken upon the line 2—2 of Fig. 1; and

Fig. 3 is a view in section taken upon the line 3—3 of Fig. 1.

For the purpose of illustrating our invention we have shown in the accompanying drawings one form thereof which is at present preferred by us, since the same has been found in practice to give satisfactory and reliable results, although it is to be understood that the various instrumentalities of which our invention consists can be variously arranged and organized and that our invention is not limited to the precise arrangement and organization of the instrumentalities as herein shown and described.

Referring to the drawings in detail, the reference numeral 1 designates the bottom of the pan, the reference numerals 2 and 3 represent the end walls of the baking pan, and the reference numerals 4 and 5 designate the fluted side walls of the baking pan. The bottom wall, the side walls, and the end walls are of integral structure and are joined together upon curved lines, as clearly shown in the drawings. The fluted portion of each side wall is extended inwardly to form vertical, spaced portions 6. In the drawings eight of these portions 6 are shown, four upon each side of the baking pan. The portions 6 are oppositely disposed with a continuous narrow central space therebetween, as clearly shown in Fig. 1. In this connection it is to be noted that the fluted surfaces provide a pronounced extra heating surface by means of spaces 7 whereby the rolls may be subjected to extra heat at their ends, as is apparent.

It will be apparent from the foregoing that the oppositely located or juxtaposed fluted portions of the pan extend inwardly a substantial distance, leaving a comparatively narrow central space so that the connecting portions between the biscuits are narrow and substantially the entire surface of the biscuit is crusted.

By employing a baking pan of the character above stated, the rolls when baked are secured together and while the exterior portions of the rolls are formed of crust, the adjacent or connecting portions of the rolls are not connected by a crust, but on the contrary the connecting portion is comprised of relatively soft dough. It is merely necessary to remove the rolls, break them apart, and readily separate one soft dough side and insert a hot sausage or "hot dog", as is readily apparent.

It will now be apparent that we have devised a novel and useful construction which embodies the features of advantage enumerated as desirable in the statement of the invention and the above description and while we have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described our invention, what we claim as new and desire to secure by Letters Patent, is:

1. As a new article of manufacture a baking pan comprising a relatively flat bottom, fluted sides and relatively flat ends, the said fluted sides being extended inwardly a substantial distance to provide opposed, spaced partitions leaving an unobstructed narrow central space extending throughout the length of said pan.

2. As a new article of manufacture, a baking pan comprising an integral structure having a relatively flat bottom, fluted sides and relatively flat ends, the said fluted sides being extended inwardly a substantial distance to provide opposed, spaced partitions leaving an unobstructed narrow central space extending throughout the length of said pan, the side, end and bottom walls of said pan being connected upon curved lines.

3. A baking pan, comprising a bottom and upright ends and fluted side walls, the oppositely located side fluted portions extending inwardly a substantial distance and in transverse alignment, leaving a comparatively narrow longitudinal central space, whereby the connecting portions are narrow, and substantially the entire surface of the article baked can be crusted.

In testimony whereof, we have hereunto signed our names.

WILLIAM EHRHART.
ROBERT D. GOLDFEDER.